May 11, 1965     E. T. SCHONHOLZER     3,183,430
MAGNETIC AMPLIFIER-CONTROLLED TRANSISTOR APPARATUS
Filed July 18, 1960     4 Sheets-Sheet 1

INVENTOR
Emil T. Schonholzer
BY
ATTORNEY

United States Patent Office 3,183,430
Patented May 11, 1965

3,183,430
MAGNETIC AMPLIFIER-CONTROLLED
TRANSISTOR APPARATUS
Emil T. Schonholzer, Williamsville, N.Y., assignor to Westinghouse Electric Corporation, East Pittsburgh, Pa., a corporation of Pennsylvania
Filed July 18, 1960, Ser. No. 43,515
24 Claims. (Cl. 321—47)

This invention relates to the electrical control art and has particular relationship to apparatus for controlling the conduction of controlled rectifiers particularly of the silicon-type such as the Westinghouse Trinistor controlled rectifiers. This invention also has particular relationship to apparatus including such controlled rectifiers.

The conduction of a controlled rectifier is determined by impressing on the gate or control electrode of the controlled rectifier a current pulse of at least a predetermined magnitude having a relatively sharp wave front and having a predetermined duration. It is broadly an object of this invention to provide apparatus for supplying such pulses to controlled rectifiers and controlled rectifier combinations including such pulse-supply apparatus.

Collins 2,809,303 typifies apparatus in accordance with the teachings of the prior art for producing pulses. Such apparatus includes a pair of transistors which are controlled from magnetic amplifiers (for example, 11 and 12 of FIG. 1). While pulse producing apparatus as disclosed by Collins has numerous important practical uses, such apparatus has not operated with the high reliability desired when used to supply pulses to control the conduction of controlled rectifiers particularly of the silicon type. It is then a specific object of this invention to provide pulse producing apparatus for producing pulses capable of reliably and precisely controlling the conduction of controlled rectifiers.

It is an incidental object of this invention to provide reliably operating apparatus for producing signals of abrupt wave front.

This invention arises from the realization that apparatus such as that disclosed by Collins when used for controlling the conduction of controlled rectifiers has proved disadvantageous because of the diversity of the characteristics of the transistors which are used in this apparatus. In arriving at this invention it has been discovered that because of the variation in the characteristics of such elements as transistors the pulses delivered by such apparatus as is disclosed by Collins are not always adequate to reliably fire controlled rectifiers. Specifically, it has been discovered that a pulse producer of the Collins type which is capable of producing adequate pulses to fire a controlled rectifier reliably loses its reliability when one or the other of the transistors is replaced or after the transistors or other components have aged.

In accordance with this invention pulse producing apparatus is provided in which the transistor or equivalent valves which follow the output signals of a magnetic amplifier include positive feedback connections so that once a signal for producing a pulse is impressed, the feedback assures that the pulse is produced even if the impressed signal is again removed or the characteristics of the valves or transistors have been changed materially by aging or by replacement. Specifically, apparatus in accordance with this invention includes a magnetic amplifier having a pair of gate windings. The gate windings are energized from an alternating current supply and during operation the magnetic amplifier is controlled so that the gate windings conduct current during succeeding opposite-polarity half periods of the supply. Apparatus in accordance with this invention includes controlled valves such as transistors which are connected in a bi-stable flip-flop network with positive feedback between the valves. Each of the valves is controlled by one of the output windings of the magnetic amplifier means and the network flops from one condition to the other condition as current is supplied alternately to the gate windings of the magnetic amplifier. The gate windings must supply sufficient current to overcome not only the normal blocking of the valve but also to overcome the blocking effect of the feedback. Because of the feedback the operation is not materially affected by the changes in characteristics of the valves.

The transition of the flip-flop network from one condition to another produces a signal having an abrupt step wave form. This signal is converted into a pulse of predetermined duration by pulse shaping means, which may be a saturable transformer, connected to the network. The output of the pulse shaping means is impressed as a gating signal in the controlled silicon rectifiers to fire the rectifiers. The above described pulse producing apparatus is capable of delivering firing pulses for the controlled rectifiers only during the operating condition of the magnetic amplifier. There are situations in which firing pulses should also be delivered during standby. Such a requirement may arise where the controlled rectifiers are connected in a converter circuit and it is undesirable that the inverter operation fail due to the absence of firing pulses. To meet such requirements apparatus in accordance with this invention is provided in which the flip-flop network is during standby flopped by marker signals impressed late in the half-periods of the supply. The apparatus then produces firing pulses late in the half-periods. These pulses maintain the controlled rectifiers in operation even when the magnetic amplifier is cut off. The marker signals are derived from a saturable transformer which is synchronized with the alternating supply that energizes the gate windings of the magnetic amplifier.

The novel features considered characteristic of this invention are disclosed generally above. The invention itself both as to its organization and as to its method of operation together with additional objects and advantages thereof will be understood from the following description of a specific embodiment taken in connection with the accompanying drawings in which:

FIGS. 2 and 4 are included for the purpose of aiding those skilled in the art in the practice of this invention and not with any intention of in any respect limiting the scope of this invention.

Figure 1:
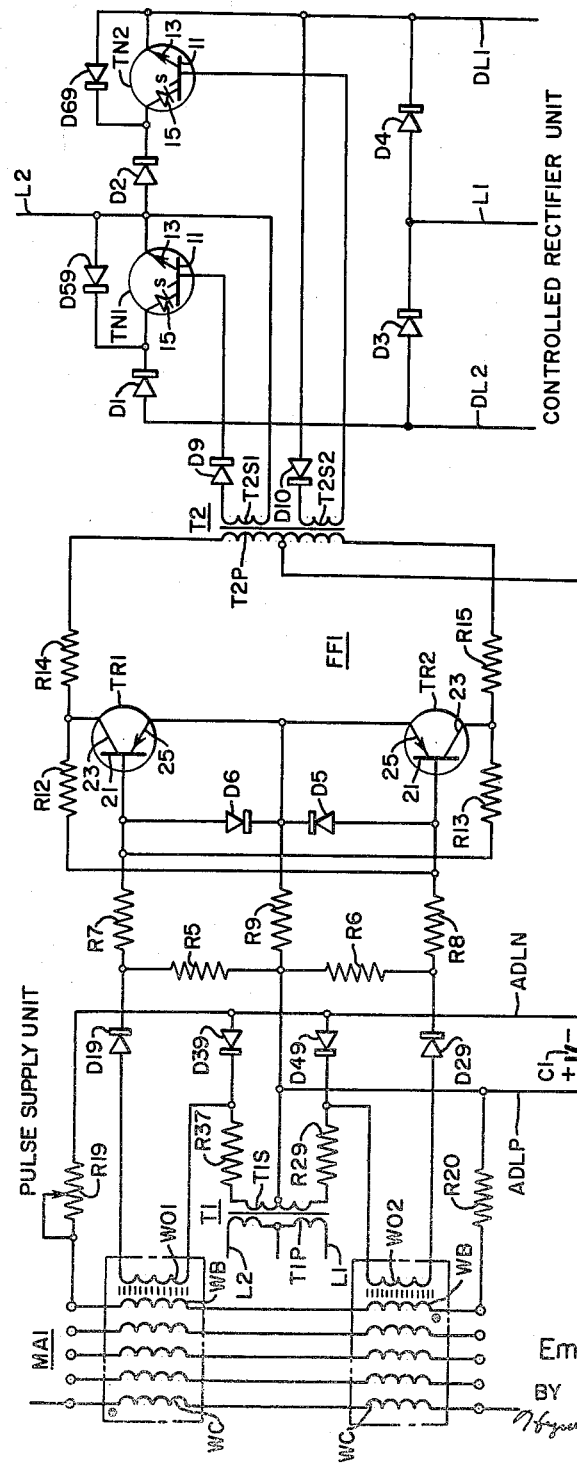
FIG. 1 is a schematic showing of an embodiment of this invention.
Figure 2:
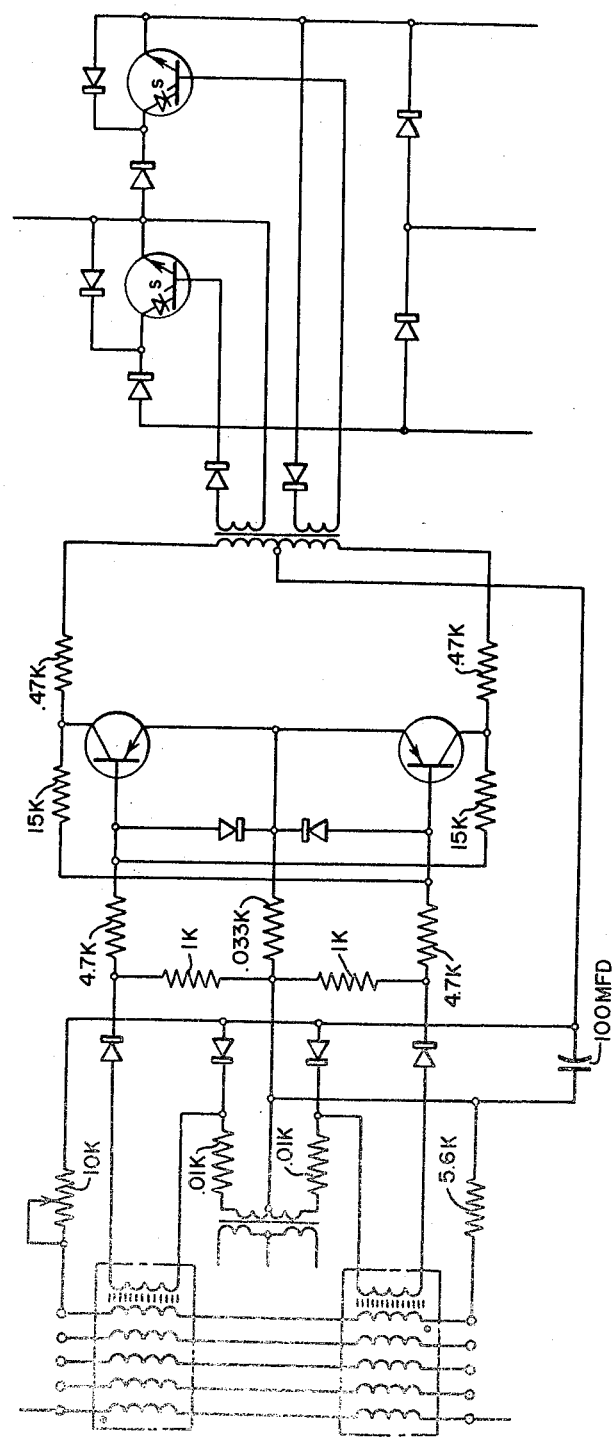
FIG. 2 is a schematic similar to FIG. 1 but showing the magnitudes and identifications of the components used in actual apparatus in accordance with FIG. 1 which was tested and found to operate satisfactorily.

The apparatus shown in FIG. 1 includes a Controlled Rectifier Unit and a Pulse Supply Unit. This apparatus may be supplied from single phase alternating current conductors L1 and L2 which derive their power from commercial conductors through the usual switches or disconnects (not shown). The Pulse Supply Unit supplies pulses to control the supply of current by the Controlled Rectifier Unit. The Controlled Rectifier Unit supplies the load conductors DL1 and DL2 which may be connected to energize a direct current load (not shown).

The Controlled Rectifier Unit includes controlled rectifiers TN1 and TN2 of the silicon type. These may be Westinghouse Trinistor controlled rectifiers. Each of these rectifiers TN1 and TN2 has a gating electrode 11 and output electrodes 13 and 15. Essentially the electrodes 11 and 13 may be regarded as input electrodes and 15 and 13 as output electrodes.

Rectifiers TN1 and TN2 may be fired by impressing a current pulse between the input electrodes 11 and 13. Such a pulse produces conduction between the output electrodes 15 and 13. These rectifiers operate similar to a thyratron in that the interruption of the firing pulse between electrodes 11 and 13 after the pulse has been impressed and conduction has started does not interrupt the conduction between electrodes 15 and 13. The conduction continues until the potential between 15 and 13 is reversed or reduced to zero for a sufficiently long interval to stop the flow of electrons and holes.

The Controlled Rectifier Unit also includes the diodes D1, D2, D3, and D4. These diodes are preferably of the silicon type and are capable of conducting the current which is conducted by the controlled rectifiers TN1 and TN2. The rectifiers TN1 and TN2 and diodes D1 through D4 are connected in a bridge network between the supply conductors L1 and L2 and the load conductors DL1 and DL2. Conductor L1 is connected between the rectifiers D3 and D4 and conductor L2 between the controlled rectifier TN1 and rectifier D2. To suppress back potential, diodes D59 and D69 are connected inversely across electrodes 13 and 15 of each of the rectifiers TN1 and TN2.

Reliable pulses for firing the controlled rectifiers TN1 and TN2 are provided by the Pulse Supply Unit. This unit includes a magnetic amplifier MA1, a flip-flop FF1 and a pulse shaping transformer T2 which is of the saturable type. The Pulse Supply Unit is energized from conductors L1 and L2 through transformer T1. The primary T1P of T1 is connected to conductors L1 and L2. Direct current for the Pulse Supply Unit is derived from conductors ADLP and ADLN which are energized from the secondary T1S of T1 through diodes D39 and D49 and resistors R29 and R37 connected in a full wave rectifying circuit. Smoothing capacitor C1 is connected between ADLP and ADLN. By way of example, amplifier MA1 is shown as a self-saturating magnetic amplifier and includes a plurality of control windings which may serve to control the apparatus in the manner desired. Such control windings usually include a bias control winding through which the output between DL1 and DL2 is given a certain pattern and the windings which customarily serve for regulation purposes. For the purpose of facilitating the explanation of this invention it will be assumed that basically the operation of the magnetic amplifier is controlled by two of the windings: a winding WB through which bias ampere turns are supplied from ADLP and ADLN through resistors R19 and R20, and a control winding WC. When the ampere turns through WC is of a predetermined magnitude the bias ampere turns are counteracted and the magnetic amplifier MA1 conducts.

The magnetic amplifier MA1 also includes gate windings W01 and W02.

The secondary T1S is connected to supply the windings W01 and W02. Winding W01 operates through diode D19 and winding W02 through diode D29. Being supplied from L1 and L2, the magnetic amplifier MA1 is alternating current (A.C.) powered and conducts current flow through W01 when the left-hand terminal of T1S is positive and through W02 when the right-hand terminal of T1S is positive (as seen in FIG. 1). When the left-hand terminal of T1S is positive, current flows in the circuit extending from the left-hand terminal through resistor R37, winding W01, D19, a resistor R5 to the center tap of T1S. When the righthand terminal of T1S is positive, current flows from this terminal through resistor R29, W02, D29, resistor R6 to the center tap of T1S.

The flip-flop FF1 includes the transistors TR1 and TR2. Each transistor has a base 21, a collector 23 and an emitter 25. Collector 23 of TR1 is connected in positive feedback relationship to the base 21 or TR2 through resistor R12. Collector 23 of TR2 is similarly connected through the resistor R13 to the base 21 of TR1. Flip-flop FF1 also includes diodes D5 and D6. D6 is connected between the base 21 and the emitter 25 of transistor TR1 so as to conduct current transmitted from W01 through D19. D5 is similarly connected between the base 21 and emitter 25 of transistor TR2 to transmit current from W02. D5 and D6 are connected opposing. When current flows through D6 because W01 conducts current, there is a small drop across D6 because of which the base 21 becomes electrically positive relative to the emitter 25 of transistor TR1. This small positive potential would cause transistor TR1 to block. A similar drop having a like effect is produced across D5 when W02 conducts current. Windings W01 and W02 thus control of flip-flop FF1 by controlling transistors TR1 and TR2, respectively.

The flip-flop FF1 is supplied from the direct current conductors ADLP and ADLN. The emitters and collectors of TR1 and TR2 are supplied from conductors ADLP and ADLN through resistor R9, resistors R14 and R15 and the primary T2P of pulse shaping transformer T2. The circuit for TR1 extends from ADLP through R9, emitter 25 and collector 23 of TR1, resistor R14, the upper section (as seen in FIG. 1) of T2P to ADLN. The circuit for TR2 extends from ADLP through R9, emitter 25 and collector 23 of TR2, resistor R15, lower portion of T2P.

The pulse shaping transformer T2 has secondaries T2S1 and T2S2. Secondary T2S1 is connected between the input electrodes 11 and 13 of the controlled rectifier TN1, through diode D9. T2S2 is similarly connected to the input electrodes 11 and 13 of controlled rectifier TN2 through diode D10. D9 and D10 are poled so as to suppress negative pulses and prevent such pulses from being impressed between the electrodes 11 and 13.

In the standby condition of the apparatus shown in FIG. 1, capacitor C1 is charged and there is potential between ADLP and ADLN. The magnetic amplifier MA1 is biased to non-conduction by the ampere turns through the winding WB. There is no current flowing through the windings WC and the output of W01 and W02 is substantially zero. One of the transistors TR1 or TR2 of flip-flop FF1 is then conducting and the other non-conducting. Assume that TR1 is conducting and TR2 non-conducting. Substantially constant current then flows through the primary T2P and the voltage supplied by the secondaries T2S1 and T2S2 is zero so that the rectifier bridge including the controlled rectifiers TN1 and TN2 has zero output. The current through TR1 flows from ADLP through R9, emitter 25, collector 23 of R14, the upper half of 2TP to ADLN. The drop across R9 produces a small current through D5 in circuit R9, R6, R8, D5. The base 21 of transistor TR2 is then positive relative to the emitter 25 of this transistor by the drop across D5. Transistor TR2 is then maintained non-conducting.

In operation, controlling ampere turns are supplied to WC. If these ampere turns are sufficient the biasing effect of the ampere turns through WB is counteracted and W01 and W02 conduct current during successive half periods of the alternating potential L1, L2. The conduction of current through each winding W01 and W02 starts abruptly at an instant or firing angle dependent on the relationship between the ampere turns through WC and the ampere turns through WB. This instant or firing angle may be adjusted over a range of about 160 degrees of each half period by varying the control current supplied to WC. Thus in response to a control signal, the magnetic amplifier MA1 produces a series of pulses having abrupt wavefronts, the consecutive pulses being alternately produced by the respective gate windings W01 and W02 on opposite half-cycles of the applied A.C. respectively, i.e., W01 produces every other pulse, and W02 produces the intermediate pulses. The positions in time (phase position) of the wavefronts of these pulses are dependent on the value of a variable parameter of the control signal, in this case the magnitude of control current.

When the upper terminal of T1S is positive relative to the lower terminal, current flows through W01 in a circuit extending from the upper terminal through R37, W01, D19, R5 to the center tap of T1S. A potential is thus impressed across R5 which causes current to flow through D6. The resulting drop between the base 21 and the emitter 25 of transistor TR1 interrupts conduction and the collector 23 of TR1 rises to the substantial negative potential of the conductor ADLN. This potential is impressed through R12 on the base 21 of transistor TR2 causing the latter to conduct. Current now flows in circuit extending from ADLP through R9, emitter 25 and collector 23 of TR2, R15, the lower portion of T2P to the conductor ADLN. This current starts to flow abruptly thus producing a step signal. The conduction through R9 maintains current through D6 which maintains TR1 non-conducting.

Because of the abrupt change of current flow from the upper portion of T2P to the lower portion, a voltage is induced in T2S1 and T2S2. Because T2 is a saturating transformer this voltage appears across T2S1 and T2S2 as a pulse of substantially abrupt wave front having a substantially flat top. The pulse has a predetermined duration which in the preferred practice of this invention should be of the order of about 30 degrees of a half-period and occurs at an instant in the half-period of L1, L2 during which W01 conducts determined by the ampere turn through WC and WB.

Depending on the polarity of the pulse, one pulse across T2S1 or T2S2 is transmitted and the other suppressed. Assume that the pulse has a polarity such as has to be transmitted by D9. This pulse then appears between the base 11 and the emitter 15 of rectifier TN1. The polarity of transformer T1 is so related to the polarity of L1, L2 that during the half period during which this pulse is produced L1 is electrically positive relative to L2. Current then flows from L1 through D4, conductor DL1, the load, conductor DL2, D1, TN1 to L2.

In the preferred practice of this invention the pulse transmitted by D9 should be sufficiently long to fire the rectifier TN1 in situations in which the anode potential impressed on the rectifier from conductors L1 and L2 may be displaced in phase from the potential which appears across L1, L2 by a reasonable phase angle. Such displacement may, for example, occur where the load impresses a counter E.M.F. such as that produced by a motor. In situations of this type a sharp pulse impressed on the controlled rectifier TN1 would fail to fire the rectifier since at the instant when the pulse is impressed the potential between the principal electrodes 15 and 13 may be of the improper polarity.

During the succeeding half period winding W02 conducts current in a circuit extending from the lower terminal of T1S through R29, W02, D29, R6 to the center tap of T1S. In this case TR2 is blocked and TR1 rendered conducting so that a pulse is transmitted through the upper half of T2P. In this case D9 suppresses the pulse and D10 passes it and TN2 is rendered conducting to supply current in a circuit extending from L2 through D2, TN2, DL1, the load DL2, D3 to L1.

In the apparatus shown in FIG. 1 one or the other of the transistors TR1 or TR2 conducts during standby. This mode of operation may demand that one or the other of the transistors conduct for an indefinite duration. This may be undesirable in certain situations. In addition in the converter circuit as shown in FIG. 3 with an inductive load one has to make sure that firing during inverter operation is maintained even if a signal from the magnetic amplifier is absent.

Figure 3:
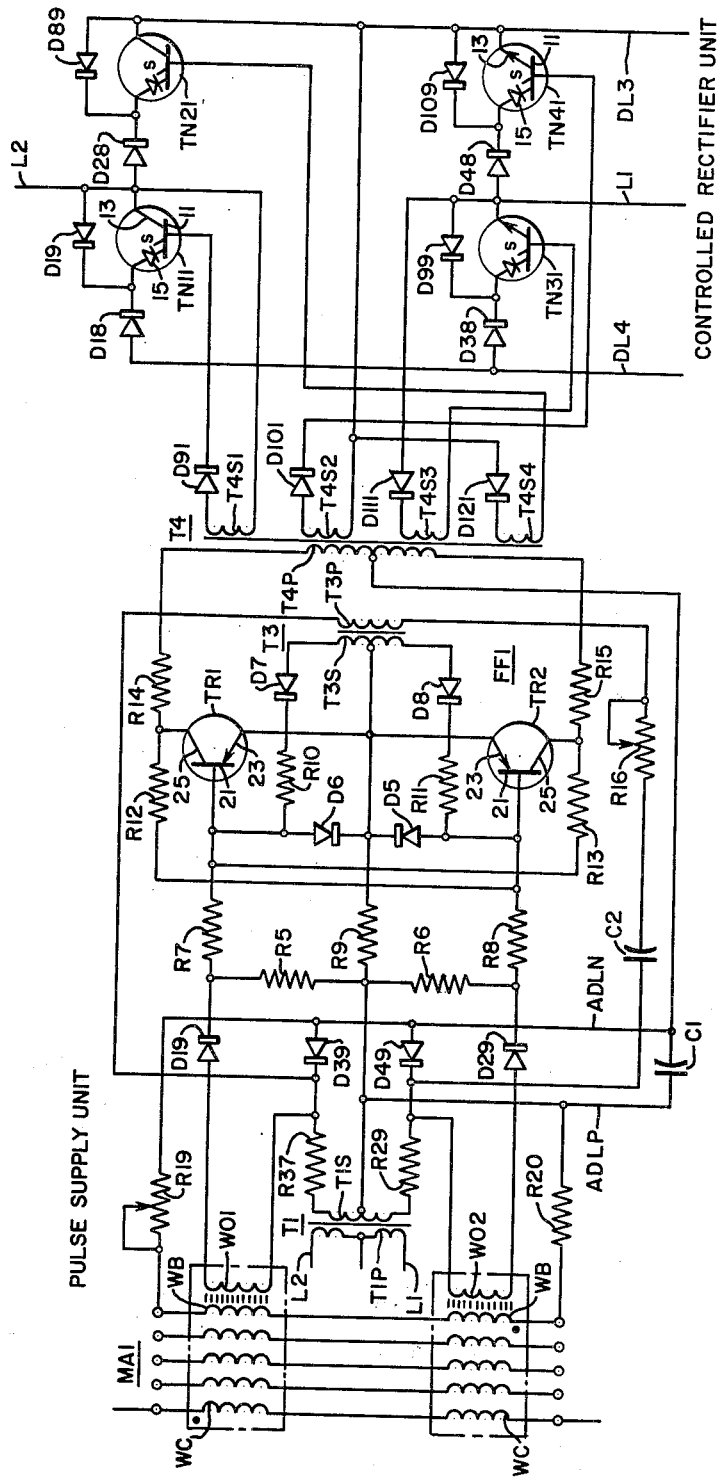
FIG. 3 is a schematic of a modification of this invention.
Figure 4:
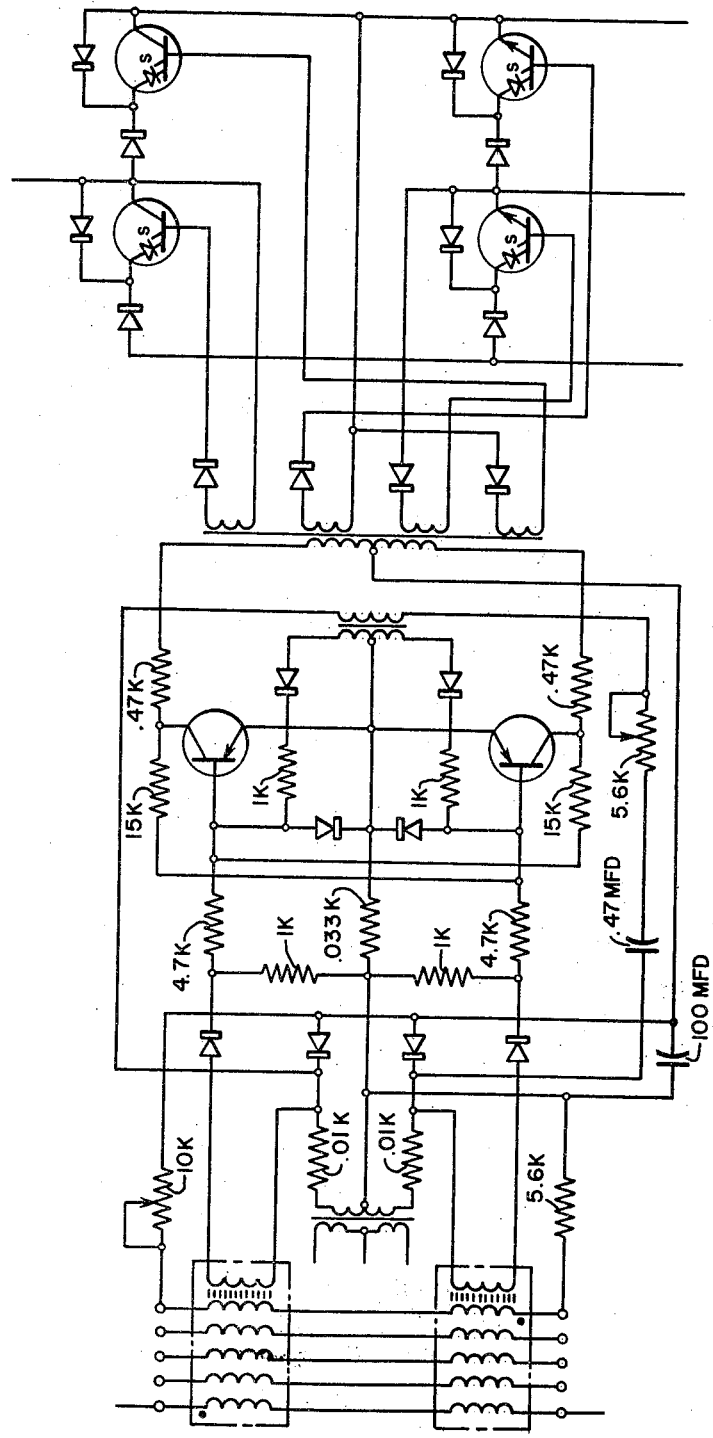
FIG. 4 is a schematic similar to FIG. 2 but showing the magnitudes and identifications of the components of an actual embodiment of this invention in accordance with FIG. 3 which was used and found to operate satisfactorily.

The above-described operation is achieved in the modification of this invention, shown in FIG. 3, by providing facilities for impressing during standby a marker signal on the flip-flop FF1 late in the half periods of the supply of the potential derived from L1, L2. Such a marker signal may be provided by saturable transformer T3. This transformer T3 has a primary T3P and a secondary T3S and is saturable so that a potential of short duration and sharp wave front appears across the secondary T3S when a half-wave of potential is impressed across the primary T3P. The primary T3P is supplied from the secondary T1S through resistors R37 and R29 and a phase shift network including capacitor C2 and variable resistor R16. The phase shift network is so set that the potential of short duration on T3S appears late in each half period of the potential betwen L1 and L2.

One terminal of the secondary T3S is connected to the base 21 of TR1 through resistor R10 and diode D7. The other terminal is similarly connected to the base 21 of TR2 through resistor R11 and diode D8. The center tap of T3S is connected to the common junction of the emitters 23 of the transistors TR1 and TR2. The diodes D7 and D8 are so poled that potentials of short duration are impressed during succeeding half periods across diodes D6 and D5, respectively, to cause each diode D6 and D5 in its turn to conduct pulses of short duration near the ends of the half periods. When each diode conducts the potential drop cross it it is impressed between the associated base and the associated emitter in such a sense as to block the associated transistor. Thus, near the end of each half period of the potential derivable from L1 and L2, there is a transitional operation of the flip-flop FF1 producing a signal abrupt wave front. The potential derivable from T3S across D6 or D5 should not persist beyond the half period during which it is impressed.

The apparatus shown in FIG. 3 includes a pulse-shaping saturable transformer T4 having a single primary T4P and a plurality of secondaries T4S1, T4S2, T4S3, and T4S4. The controlled rectifier unit is in this case also of the bridge type but includes controlled rectifiers TN11, TN21, TN31, TN41 which are connected in a rectifier bridge network in series with diodes D18, D28, D38, D48. The principal electrodes 13 and 15 of the controlled rectifiers TN11, TN21, TN31, TN41 are shunted inversely by diodes D79, D89, D99 and D109, respectively, so as to suppress any back voltage across the controlled rectifiers. The secondaries T4S1, T4S2, T4S3 and T4S4 are connected respectively through the diodes D91, D101, D111, and D121 between the control electrodes 11 and the bases 13 of the controlled rectifiers TN11, TN21, TN31 and TN41.

During standby the flip-flop FF1 is flopped from a condition in which TR1 conducts to a condition in which TR2 conducts late in each half period of the supply by the operation of transformer T3. During each flopping operation a potential of a predetermined duration is impressed in the secondaries T4S1, T4S2, T4S3 and T4S4. It may be assumed that the potential impressed during one of the half periods is transmitted by diodes D91 and D101 and suppressed by diodes D111 and D121. During this half period TN11 and TN41 are then capable of being rendered conducting. During this same half period L1 is electrically positive relative to L2. Current then flows from L1 through D48, TN41, DL3, the load, DL4, D18, TN11 through L2. During the succeeding half periods D111 and D121 are capable of conducting and L2 is electrically positive relative to L1 so that current flows from L2 through D2, TN21, DL3, the load, DL4, D38, TN31 to L1. The current which flows in a resistive load under such circumstances through the controlled rectifiers is relatively small.

When load current is actually to flow the control winding WC is supplied with adequate ampere turns to cause current to flow through the output windings W01 and W02 beginning at the desired instant in the half periods of the supply. The flip-flop FF1 is then flopped correspondingly early and the desired load current flows to the controlled rectifiers TN11 and TN41 and TN21 and TN31.

The system shown in FIG. 3 is of particular advantage in situations in which all 4 branches of the bridge arrangement are controlled and the loading is inductive. In such situations the current in the inductive load continues to flow through the already conducting controlled rectifier pair. When the line voltage becomes negative, the needed voltage to maintain a constant current is then supplied by the inductance of the load until the other pair of controlled rectifier is fired. The output voltage reaches 0 at a retardation of the firing angle of about 90°. During transient operation the firing angle can be retarded up to 180°, which means complete inversion of the output voltage. The current will continue to flow in the same direction. The needed voltage is supplied by the load inductance until it is discharged ($d\phi/dt=0$), at which time the current ceases. This operation yields a forcing action on the current which is often desirable in regulating systems. It has to be kept in mind that the current cannot reverse.

A marker pulse which stops the retardation of the firing angle at approximately 175° is a built-in feature of the firing circuit. It is needed to maintain firing for proper commutation, even under presence of large negative input signals.

While preferred embodiments of this invention have been disclosed herein, many modifications thereof are feasible. This invention then is not to be restricted except insofar as is necessitated by the spirit of the prior art.

I claim as my invention:

1. Apparatus for producing a signal of steep wave front including magnetic-amplifier means having a first output winding and a second output winding, first and second transistors each having a base, an emitter and a collector, positive feedback connections between each collector and the base of the other transistor, means connecting said first winding in controlling relationship with the emitter and base of said first transistor, and means connecting said second winding in controlling relationship between the emitter and base of said second transistor.

2. Apparatus for producing pulses particularly for rendering conducting controlled rectifiers of the silicon type comprising, a magnetic amplifier having control-winding means and gate-winding means, means connected to said control-winding means for supplying ampere turns to said control-winding means to control the output of said gate-winding means, said gate-winding means including at least a first winding and a second winding, a first transistor and a second transistor, each transistor having input and output electrodes, means connecting said input electrodes of said first and second transistors to the output electrodes of said second and first transistors, respectively, in positive feedback relationship, so that non-conduction of one of said transistors produces conduction of the other, means connecting said first winding in transistor-conduction blocking relationship with said input electrodes of said first transistor, and means connecting said second winding in transistor conduction blocking relationship with said input electrodes of said second transistor so that ampere turns through either winding produces non-conduction of the associated transistor, a saturable transformer having a primary and a secondary, power supply means and means connecting said power supply means and said primary to said transistor so that on conduction of one of said transistors current of one polarity flows through said primary and on the conductions of said other transistor current of the opposite polarity flows through said primary.

3. Pulse producing apparatus including a magnetic amplifier having output-winding means including a first winding and a second winding, means connected to said amplifier for controlling the ampere turns of said output winding means, a bi-stable flip-flop network having a pair of output circuits and an input circuit connected to each output circuit for controlling said last-named output circuit and also including feedback connections between each output circuit and the input circuit controlling the other output circuit so that the presence of an output across one output circuit impresses a potential across the input circuit controlling said other output circuit to suppress the output of said other output circuit, means connecting each winding in controlling relationship with a different one of said input circuits, and pulse-shaping means connected to said output circuits for deriving pulses of a predetermined duration from said output circuits.

4. Apparatus for producing a signal having an abrupt wave front including a magnetic amplifier having gate-winding means including a first winding and a second winding, means connected to said amplifier for controlling the ampere turns of said gate-winding means, a bi-stable flip-flop network having a pair of output circuits and an input circuit connected to each output circuit for controlling the output of said last-named output circuit, said bi-stable network also including positive-feedback connections between each output circuit and the input circuit controlling the other output circuit so that an output at one output circuit impreses potential on the input circuit controlling the other output circuit such as to suppress the output of said last-named output circuit, means connecting said first winding in output circuit controlling relationship with one of said input circuits, and means connecting said second winding in output circuit controlling relationship with said other input circuit.

5. Apparatus for producing a signal having an abrupt wave front including a magnetic amplifier having gate-winding means, means connected to said amplifier for controlling the ampere turns of said gate-winding means, a flip-flop network having a pair of output circuits and an input circuit connected to each output circuit for controlling the output of said last-named output circuit, said flip-flop network also including positive-feedback connections between each output circuit and the input circuit controlling the other output circuit so that an output at one output circuit impresses potential on the input circuit controlling the other output circuit such as to suppress the output of said last-named output circuit, and means connecting said gate-winding means in output-circuit controlling relationship with at least one of said input circuits.

6. Apparatus for producing a signal having an abrupt wave front including a magnetic amplifier having gate-winding means, means connected to said amplifier for controlling the ampere turns of said gate-winding means, a flip-flop network having a pair of output circuits and an input circuit connected to each output circuit for controlling the output of said last-named output circuit, said flip-flop network also including positive-feedback connections between each output circuit and the input circuit controlling the other output circuit so that an output at one output circuit impresses potential on the input circuit controlling the other output circuit such as to suppress the output of said last-named output circuit, means connecting said gate-winding means in output-circuit controlling relationship with at least one of said input circuits, and pulse shaping means connected to at least one of said output circuits for deriving a pulse of predetermined duration from said one output circuit.

7. Apparatus for producing a signal having an abrupt wave front including a magnetic amplifier having gate-winding means including a first winding and a second winding, means connected to said amplifier for controlling the ampere turns of said gate-winding means, a network having a first output circuit and a second output circuit and a first input circuit for controlling the output of said first output circuit and a second input circuit for controlling the output of said second output circuit, means connecting said first winding in output circuit controlling relationship with said first input circuit, means connecting said second winding in output-circuit controlling relationship with said second input circuit, and pulse shaping means connected to at least one of said output circuits for deriving therefrom a pulse of abrupt wave form and of predetermined duration.

8. Apparatus for producing a pulse signal of predetermined duration and of abrupt wave form including a magnetic amplifier having gate-winding means, means connected to said amplifier for controlling the ampere turns of said gate-winding means, conversion means having a first condition in which it has a first output and a second condition in which it has a second output substantially different from said first output, means connecting said gate-winding means in controlling relationship with said conversion means to cause said conversion means to respond to ampere turns in said gate-winding means to pass abruptly from one of said conditions to the other condition and to remain in said other condition, and wave shaping means connected to said conversion means for deriving a pulse signal of said predetermined duration and of said wave form from said conversion means when it passes from said one condition to said other condition.

9. Control apparatus including a controlled rectifier of the silicon type having a control electrode and a plurality of principal electrodes, the impressing of a pulse of predetermined magnitude, duration and waveform between said control electrode and one of said principal electrodes producing current flow between said principal electrodes, a magnetic amplifier having control winding means and gate-winding means, ampere turns through said control-winding means producing ampere turns through said gate-winding means, means connected to said control-winding means for supplying ampere turns thereto, conversion means connected to said gate-winding means and having a first condition in which it has a first output and a second condition in which it has a second output substantially different from said first output, means connecting said gate-winding means in controlling relationship with said conversion means to cause said conversion means to respond to said ampere turns through said gate-winding means to pass from one of said conditions to the other and remain in said last-named condition, wave shaping means connected to said conversion means for deriving a pulse of said magnitude duration and wave form from said conversion means when said conversion means passes from one of said conditions to the other, and means connecting said wave shaping means to said control electrode and said one principal electrode for impressing said last-named pulse between said control electrode and said one principal electrode.

10. Control apparatus including a controlled rectifier of the silicon type having input electrodes and output electrodes, a potential pulse of predetermined magnitude, wave form and duration between said input electrodes producing current between said output electrodes, magnetic amplifier means, having control winding means and a first gate-winding and a second gate-winding, means connected to said control winding means for controlling the ampere turns through said gate-windings, means for supplying alternating current, means connecting said supply means in opposite-phase current-supply relationship with said first winding and said second winding, ampere turns through said control winding means producing ampere turns through said first winding and through said second winding alternately during succeeding half periods of said alternating current, a first transistor, a second transistor, each transistor having a collector, an emitter and a base, positive feedback connections between each collector and the base of the other transistor, means connecting said first winding in controlling relationship with said base and emitter of said first transistor, means connecting said second winding in controlling relationship with the base and emitter of said second transistor, pulse shaping means connected to the collectors and emitters of said transistors to derive pulses of said predetermined magnitude, wave-form and duration from each emitter and collector as the conductivity between said last-named emitter and collector changes responsive to ampere turns through the winding connected to the associated base and emitter, and means connecting said input electrodes to said pulse shaping means for impressing said derived pulse on said input electrodes.

11. Apparatus for producing a signal having an abrupt wave front including a magnetic amplifier having gate-winding means, means connected to said amplifier for controlling the ampere turns through said gate-winding means, alternating current supply means, means connecting said supply means in power supply relationship with said gate-winding means, conversion means connected to said gate-winding means and having a first condition in which said conversion means has a first output and a second condition in which said conversion means has a second output substantially different from said first output, means connecting said gate-winding means in controlling relationship with said conversion means to cause said conversion means to respond to ampere turns through said gate-winding means to pass from one of said conditions to said other condition and to remain in said last-named condition, and means connected to said conversion means for causing said conversion means to pass alternately from one of said conditions to the other and from said last-named condition to said one condition at predetermined instants in the half periods of said alternating current independently of the presence or absence of ampere turns in said gate-winding means.

12. Apparatus for producing a signal having an abrupt wave front including a magnetic amplifier having gate-winding means, means connected to said amplifier for controlling the ampere turns through said gate-winding means, alternating current supply means, means connecting said supply means in power supply relationship with said gate-winding means, conversion means connected to said gate winding means and having a first condition in which said conversion means has a first output and a second condition in which said conversion means has a second output substantially different from said first output, means connecting said gate-winding means in controlling relationship with said conversion means to cause said conversion means to respond to ampere turns through said gate-winding means to pass from one of said conditions to the other condition and to remain in said last-named condition, means connected to said conversion means for causing said conversion means to pass alternately from one said condition to the other and from said last-named condition to said one condition at predetermined instants late in the half periods of said alternating current independently of the presence or absence of ampere turns in said winding means, and wave shaping means connected to said conversion means for deriving pulses of said wave front and of predetermined duration when said conversion means passes from one of said conditions to another.

13. Apparatus for producing a signal having an abrupt wave front including a magnetic amplifier having gate-winding means, means connected to said amplifier for controlling the ampere turns through said gate-winding means, alternating current supply means, means connecting said supply means in power-supply relationship with said gate-winding means, conversion means connected to said gate-winding means and having a first condition in which said conversion means has a first output and a second condition in which said conversion means has a second output substantially different from said first output, means connecting said gate-winding means in controlling relationship with said conversion means to cause said conversion means to respond to ampere turns through said gate-winding means to pass from one of said conditions to said other condition and to remain in said last-named condition, means connected to said conversion means for causing said conversion means to pass alternately from one said condition to the other and from said last-named condition to said one condition at predetermined instants late in the half periods of said alternating current independently of the presence or absence of ampere turns in said winding means, wave shaping means connected to said conversion means for deriving pulses of said wave front and of predetermined duration when said conversion means passes from one of said conditions to another, and asymmetrically conducting means connected to said wave shaping means for transmitting said derived pulses of one polarity and suppressing said derived pulses of the opposite polarity.

14. Apparatus for producing a signal having an abrupt wave front including a magnetic amplifier having gate-winding means, means connected to said amplifier for controlling the ampere turns through said gate-winding means, alternating current supply means, means connecting said supply means in power-supply relationship with said gate-winding means, conversion means connected to said gate-winding means and having a first condition in which said conversion means has a first output and a second condition in which said conversion means has a second output substantially different from said first output, means connecting said gate-winding means in controlling relationship with said conversion means to cause said conversion means to respond to ampere turns through said gate-winding means to pass from one of said conditions to said other condition and to remain in said last-named condition, a saturable transformer having a primary and a secondary, phase shift impedance means, means connecting said supply means in power supply relationship with said primary and said phase-shift impedance means to impress on said primary potential displaced in phase with reference to the potential of said supply means, and means connecting said secondary potential of said transformer to said conversion means for causing said conversion means to pass alternately from one of said conditions to the other and from said last-named condition to said one condition at predetermined instants in the half periods of said alternating current independently of the presence or absence of ampere turns in said winding.

15. Pulse producing apparatus comprising magnetic amplifier means for producing consecutive output pulses with abrupt wavefronts, means for adjusting the time position of said wavefronts with respect to a reference position, a bistable flip-flop, means including coupling means between the amplifier and the flip-flop for alternating the flip-flop between its respective stable states in response to and at the occurrence rate of said consecutive output pulses, pulse shaping means for producing output pulses of predetermined duration, means responsive to the alternating states of the flip-flop for causing said pulse shaping means to produce output pulses, one for each change of state of the flip-flop, and means independent of said amplifier for alternating said flip-flop between its stable states at said occurrence rate and at a predetermined limiting position in time relative to said reference position.

16. Pulse producing apparatus comprising magnetic amplifier means for producing consecutive output pulses with abrupt wavefronts, means for adjusting the time position of said wavefronts with respect to a reference position, a bistable flip-flop, means including coupling means between the amplifier and the flip-flop for alternating the flip-flop between its respective stable states in response to and at the occurrence rate of said consecutive output pulses, pulse shaping means for producing pulses of predetermined duration, means responsive to the alternating states of the flip-flop for causing said pulse shaping means to produce output pulses, one for each change of state of the flip-flop, gateable electric valve means, means utilizing said output pulses of the pulse shaping means for gating said valves, and means independent of said amplifier for alternating said flip-flop between its stable states at said occurrence rate and at a predetermined limiting position in time relative to said reference position.

17. Pulse producing apparatus comprising magnetic amplifier means for producing consecutive output pulses with abrupt wavefronts, means for adjusting the time position of said wavefronts with respect to a reference position, a bistable flip-flop, means including coupling means between the amplifier and the flip-flop for alternating the flip-flop between its respective stable states in response to and at the occurrence rate of said consecutive output pulses, a saturating transformer, and means responsive to the alternating states of the flip-flop for alternately driving said transformer to opposite polarities to produce output pulses, one for each change of state of the flip-flop.

18. Pulse producing apparatus comprising magnetic amplifier means for producing consecutive output pulses with abrupt wavefronts, means for adjusting the time position of said wavefronts with respect to a reference position, a bistable flip-flop, means including coupling means between the amplifier and the flip-flop for alternating the flip-flop between its respective stable states in response to and at the occurrence rate of said consecutive output pulses, a saturating transformer, means responsive to the alternating states of the flip-flop for alternately driving said transformer to opposite polarities to produce output pulses, one for each change of state of the flip-flop, and means independent of said amplifier for alternating said flip-flop between its stable states at said occurrence rate and at a predetermined limiting position in time relative to said reference position.

19. Pulse producing apparatus comprising magnetic amplifier means for producing consecutive output pulses with abrupt wavefronts, means for adjusting the time position of said wavefronts with respect to a reference position, a bistable flip-flop, means including coupling means between the amplifier and the flip-flop for alternating the flip-flop between its respective stable states in response to and at the occurrence rate of said consecutive output pulses, a saturating transformer, means responsive to the alternating states of the flip-flop for alternately driving said transformer to opposite polarities to produce output pulses, one for each change of state of the flip-flop, gateable electric valve means, means utilizing said transformer output pulses for gating said valves, and means independent of said amplifier for alternating said flip-flop between its stable states at said occurrence rate and at a predetermined limiting position in time relative to said reference position.

20. Pulse producing apparatus comprising magnetic amplifier means for producing consecutive output pulses with abrupt wavefronts, said amplifier having power input means for the receipt of A.C. power, said amplifier producing successive ones of said pulses in response respectively to successive opposite half cycles of A.C. applied to said input means, means for adjusting the phase position of said wavefronts relative to said A.C., a bistable flip-flop, means for causing the flip-flop to assume one of its stable states in response to each of said pulses produced in response to half-cycles of one polarity of said A.C., means for causing the flip-flop to assume its other stable state in response to each of said pulses produced in response to half-cycles of the opposite polarity of said A.C., whereby the flip-flop is alternated between its stable states in response to said consecutive output pulses at the same frequency that said A.C. alternates between successive half-cycles of opposing polarity, pulse shaping means for producing pulses of predetermined duration, and means responsive to the alternating states of the flip-flop for causing said pulse shaping means to produce consecutive output pulses, one for each change of state of flip-flop.

21. Pulse producing apparatus comprising magnetic amplifier means for producing consecutive output pulses with abrupt wavefronts, said amplifier having power input means for the receipt of A.C. power, said amplifier producing successive ones of said pulses in response respectively to successive opposite half cycles of A.C. applied to said input means, means for adjusting the phase position of said wavefronts relative to said A.C., a bistable flip-flop, means for causing the flip-flop to assume one of its stable states in response to each of said pulses produced in response to half-cycles of one polarity of said A.C., means for causing the flip-flop to assume its other stable state in response to each of said pulses produced in response to half-cycles of the opposite polarity of said A.C., whereby the flip-flop is alternated between its stable states in response to said consecutive output pulses at the same frequency that said A.C. alternates between successive half-cycles of opposing polarity, pulse shaping means for producing output pulses of predetermined duration, means responsive to the alternating states of the flip-flop for causing said pulse shaping means to produce consecutive output pulses, one for each change of state of the flip-flop, gateable electric valve means, means utilizing said output pulses of the pulse shaping means for gating said valve means.

22. Pulse producing apparatus comprising magnetic amplifier means for producing consecutive output pulses with abrupt wavefronts, said amplifier having power input means for the receipt of A.C. power, said amplifier producing successive ones of said pulses in response respectively to successive opposite half cycles of A.C. applied to said input means, means for adjusting the phase position of said wavefronts relative to said A.C., a bistable flip-flop, means for causing the flip-flop to assume one of its stable states in response to each of said pulses produced in response to half-cycles of one polarity of said A.C., and means for causing the flip-flop to assume its other stable state in response to each of said pulses produced in response to half-cycles of the opposite polarity of said A.C., whereby the flip-flop is alternated between its stable states in response to said consecutive output pulses at the same frequency that said A.C. alternates between successive half-cycles of opposing polarity.

23. Pulse producing apparatus comprising magnetic amplifier means for producing consecutive output pulses with abrupt wavefronts, said amplifier having power input means for the receipt of A.C. power, said amplifier producing successive ones of said pulses in response respectively to successive opposite half cycles of A.C. applied to said input means, means for adjusting the phase position of said wavefronts relative to said A.C., a bistable flip-flop, means for causing the flip-flop to assume one of its stable states in response to each of said pulses produced in response to half-cycles of one polarity of said A.C., means for causing the flip-flop to assume its other stable state in response to each of said pulses produced in response to half-cycles of the opposite polarity of said A.C., whereby the flip-flop is alternated between its stable states in response to said consecutive output pulses at the same frequency that said A.C. alternates between successive half-cycles of opposing polarity, a saturating transformer, and means responsive to the alternating states of the flip-flop for alternately driving said transformer to opposite polarities to produce consecutive output pulses, one for each change of state of the flip-flop.

24. Pulse producing apparatus comprising magnetic amplifier means for producing consecutive output pulses with abrupt wavefronts, said amplifier having power input means for the receipt of A.C. power, said amplifier producing successive ones of said pulses in response respectively to successive opposite half cycles of A.C. applied to said input means, means for adjusting the phase position of said wavefronts relative to said A.C., a bistable flip-flop, means for causing the flip-flop to assume one of its stable states in response to each of said pulses produced in response to half-cycles of one polarity of said A.C., means for causing the flip-flop to assume its other stable state in response to each of said pulses produced in response to half-cycles of the opposite polarity of said A.C., whereby the flip-flop is alternated between its stable states in response to said consecutive output pulses at the same frequency that said A.C. alternates between successive half-cycles of opposing polarity, a saturating transformer, means responsive to the alternating states of the flip-flop for alternately driving said transformer to opposite polarities to produce consecutive output pulses, one for each change of state of the flip-flop, gateable electric valve means, means utilizing said transformer output pulses for gating said valve means.

References Cited by the Examiner
UNITED STATES PATENTS

| 2,531,076 | 11/50 | Moore | 307—88.5 |
| 2,809,303 | 10/57 | Collins | 307—88 |
| 2,873,422 | 2/59 | Miller | 328—89 |
| 2,989,686 | 6/61 | Pinckaers et al. | 323—89 |

RALPH D. BLAKESLEE, *Acting Primary Examiner.*
SAMUEL BERNSTEIN, LLOYD McCOLLUM,
*Examiners.*